United States Patent [19]
DeVale

[11] 3,793,540
[45] Feb. 19, 1974

[54] CONSTANT CURRENT SOURCE FOR TIME DELAY DEVICE

[75] Inventor: Donald P. DeVale, Sycamore, Ill.

[73] Assignee: AFE Industries, Inc., Lake Zurich, Ill.

[22] Filed: Dec. 4, 1972

[21] Appl. No.: 311,802

[52] U.S. Cl. .................. 307/315, 307/228, 307/232
[51] Int. Cl. .......................... H03k 3/26, H03k 19/08
[58] Field of Search ..................... 307/228, 232, 315

[56] References Cited

UNITED STATES PATENTS

| | | | |
|---|---|---|---|
| 3,192,449 | 6/1965 | Brockett | 307/315 X |
| 3,412,293 | 11/1968 | Maupin | 307/315 |
| 3,458,772 | 7/1969 | Egart et al. | 307/315 X |
| 3,643,109 | 2/1972 | Skokan | 307/215 X |

*Primary Examiner*—Andrew J. James

[57] ABSTRACT

Disclosed is an electronic delay-producing device using an electrolytic condenser and a constant current source, for charging the condenser. With a constant current source, the voltage vs time curve is linear rather than logarithmic and hence switching may be done at a lower voltage level without sacrificing the length of the time delay. Also, leakage currents and their effects on time delays are reduced. The constant current source is derived from a Darlington pair using a transistor as a non-linear resistor to feed the condenser voltage back to the base of the Darlington pair. The output of the pair remains constant over the desired range of condenser voltage values.

7 Claims, 4 Drawing Figures

CONSTANT CURRENT SOURCE FOR TIME DELAY DEVICE

This invention relates to electronic timing devices and particularly to a constant current source for such devices.

The normal electronic timing devices use a dry condenser and a resistance in series between a voltage source and ground. The R-C capacitor voltage vs time curve is logarithmic which means that the voltage across the condenser initially rises very rapidly. The capacitor leakage current also initially rises very rapidly. The curve does not flatten until the higher condenser voltage values are reached. When the normal R-C combination is used in timing circuits, problems can arise since leakage currents are affected by temperature and hence the timing varies with the temperature. Furthermore, if long time constants are desired, the asymtotic portion of the curve must be used, and this means that the timing must be done at high voltage values, which, in turn, increases the leakage currents across the condenser.

It is an object of this invention to provide a constant current source for charging a condenser so that the resultant capacitor voltage vs time curve is a straight line.

As a more specific object, this invention seeks to provide a charging current for a condenser by the use of a Darlington pair or amplifier in which the condenser voltage is fed back to the base of the amplifier in a functional manner to compensate for the normal logarithmic decrease in the current to the condenser.

These and other objects of this invention will become apparent from the following detailed description of a preferred embodiment thereof when taken together with the accompanying drawings in which.

Figure 1:
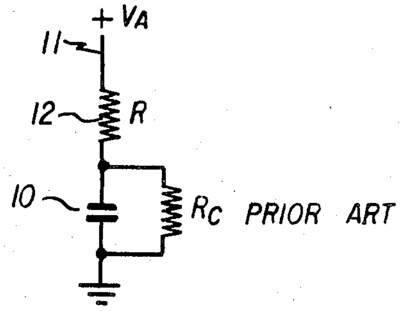
FIG. 1 is a diagram of the normal condenser charging cicuit.

Referring now to the drawings for a detailed description of the invention, the normal charging circuit of FIG. 1 shows a capacitor 10 which is to be charged from a current source 11 having a voltage $V_A$ through a series resistance 12 having a value of R megohms. The resistance developed by the condenser is designated as a resistance $R_C$ shown in shunt around condenser 11.

Figure 2:
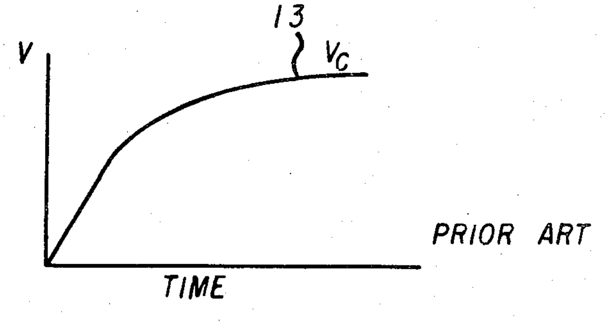
FIG. 2 is a chart of a normal prior art capacitor voltage vs time curve derived from the charging circuit of FIG. 1.

The charging rate, i.e., the R-C capacitor voltage vs time curve produced by the charging circuit of FIG. 1 is shown in FIG. 2 wherein the capacitor voltage $V_C$ is seen to vary logarithmically with time. The capacitor voltage rises very rapidly for a short time and then less and less rapidly to produce curve 13. While the voltage is rising rapidly, capacitor leakage current also rises rapidly.

When the charging circuit of FIG. 1 is used in timing circuits, problems can arise because the leakage current is affected by temperature and hence the timing may be off in varying amounts with fluctuations in temperature. Problems may also arise when long time constants are used, i.e., a long time interval is desired between the receipt of a signal and the initiation of a function in response to that signal. In the latter instance, in order to obtain this delay, the higher voltage or asymtotic portion of the curve should be used. At higher voltages, however, the capacitor leakage current increases, as does its effect on the time delays to be produced. Temperature and aging can have a drastic effect on the time interval.

The foregoing problems can be greatly reduced by using a constant current source to charge the condenser. In the example selected to illustrate this invention in FIG. 3, a constant current source is produced by using transistors 14 and 15 connected together as a Darlington pair or amplifier, the collectors 16 and 17, respectively, being connected to a common source of current 18. The condenser to be charged is shown at 19 and has one side thereof connected to the base of a third transistor 20. The emitter of transistor 20 is connected to the base of transistor 14. The collector of the third transistor 20 is unconnected and hence the latter functions as a non-linear resistance which changes the drive current to the Darlington pair such that a constant output current is produced independently of capacitor voltage. Since current is constant then voltage changes linearly with time. This eliminates the logarithmic bulge in the curve of FIG. 2 to produce the substantially straight line curve of FIG. 4.

Figure 3:
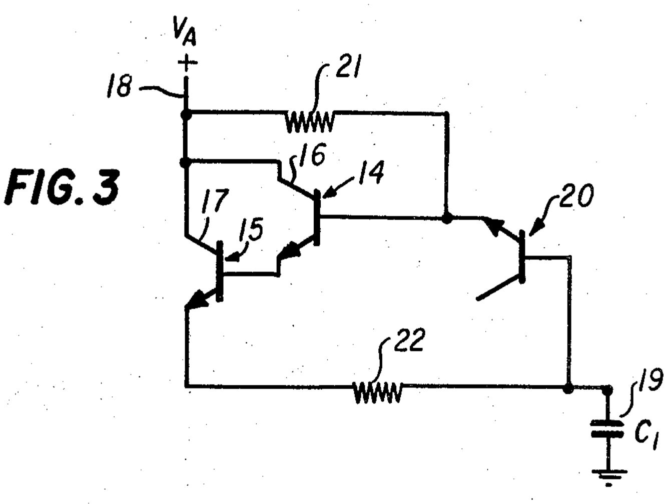
FIG. 3 is a wiring diagram of a charging circuit for a condenser made according to this invention.
Figure 4:
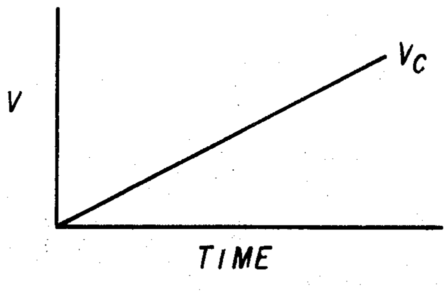
FIG. 4 is a chart of the capacitor voltage vs time curve produced by the charging circuit of FIG. 3.

The charging current in FIG. 3 is further limited by a resistance 21 connected across the current source 18 and emitter of transistor 20, and by a resistance 22 connected in series with condenser 19 and the emitter of transistor 15. In the example illustrated, resistance 21 is 10 megohms and resistance 22 is 2.2 megohms. Resistance 21 limits the base current to the Darlington emitter follower.

In the FIG. 3 charging circuit, as the condenser voltage increases, the resistance of transistor 20 increases in a manner such that the output current of the transistors 14, 15 remains constant.

Thus, the constant current of the charging circuit of FIG. 3 produces a substantially straight-line or linear voltage vs time curve. This makes possible the use of lower voltage levels for switching without sacrificing time delay, as would be the case if lower voltage levels were used for switching with the logarthmic curve of FIG. 2. Switching at lower voltage levels, in turn, reduces leakage currents and their deleterious effects upon time delays.

With the use of the constant current source of FIG. 3 and an electrolytic condenser as the recipient of the constant current, the charging rate can be reduced to so low a value as to make possible time delays of an hour or more, instead of the minute or two available with normal charging circuits.

I claim:

1. A constant current source for charging a condenser, said source comprising a current source, a condenser to be charged from said source, a Darlington pair having their collectors connected to said source, and means connecting the base of the Darlington pair to the condenser, said means compensating for the non-linear nature of the charging current to produce a substantially linear voltage vs. time curve for the charge in the condenser.

2. A constant current source as described in claim 1, said means comprising a non-linear resistor.

3. A constant current source as described in claim 2, said non-linear resistor comprising a transistor in series between the condenser and Darlington pair and having its collector unconnected.

4. A constant current source as described in claim 3, said transistor in series between the Darlington pair and condenser having its base connected to the condenser and its emitter connected to the base of the Darlington pair.

5. A constant current source as described in claim 1, and a resistor limiting the base current to the Darlington emitter follower.

6. A constant current source as described in claim 1, and means for limiting the current to the condenser when the voltage across the condenser is zero.

7. A constant current source as described in claim 4, and means for limiting the current to the condenser when the voltage across the condenser is zero, said means comprising a first resistor connected across the base of the Darlington emitter follower and the collectors of the Darlington pair, and a second resistor connected in series between the emitter of the Darlington pair and the condenser.

* * * * *